United States Patent
Simmons et al.

(10) Patent No.: US 12,088,564 B2
(45) Date of Patent: Sep. 10, 2024

(54) SECURE COMPUTATIONAL AND COMMUNICATIONS SYSTEMS

(71) Applicant: Mulberry Harbour, LLC, Annapolis, MD (US)

(72) Inventors: Wayne S. Simmons, Annapolis, MD (US); Thomas Edward LaGrega Marin, Orlando, FL (US)

(*) Notice: Subject to any disclaimer, the term of this patent is extended or adjusted under 35 U.S.C. 154(b) by 97 days.

(21) Appl. No.: 16/817,188

(22) Filed: Mar. 12, 2020

(65) Prior Publication Data

US 2020/0296079 A1 Sep. 17, 2020

Related U.S. Application Data

(60) Provisional application No. 62/817,667, filed on Mar. 13, 2019.

(51) Int. Cl.
*H04L 9/40* (2022.01)

(52) U.S. Cl.
CPC ...... *H04L 63/0414* (2013.01); *H04L 63/0876* (2013.01); *H04L 63/105* (2013.01); *H04L 63/107* (2013.01); *H04L 63/1425* (2013.01); *H04L 63/20* (2013.01)

(58) Field of Classification Search
CPC . H04L 63/0414; H04L 63/0876; H04L 63/20; H04L 63/105; H04L 63/1425; H04L 63/107; H04L 63/0272; H04L 63/0209; H04L 63/145; H04L 63/1441; H04W 12/128; H04W 12/08
USPC .......................................................... 726/26
See application file for complete search history.

(56) References Cited

U.S. PATENT DOCUMENTS

| | | | |
|---|---|---|---|
| 6,895,057 B1* | 5/2005 | Balachandran | H04L 1/1867 375/259 |
| 11,140,141 B2 | 10/2021 | Fiske | |
| 11,777,927 B1* | 10/2023 | Abid | H04L 63/0884 726/4 |
| 2005/0114710 A1* | 5/2005 | Cornell | G06F 21/85 726/4 |
| 2008/0108405 A1* | 5/2008 | Brosnan | G07F 17/32 463/16 |
| 2010/0323669 A1* | 12/2010 | Maggenti | H04L 65/4061 455/413 |
| 2011/0083004 A1* | 4/2011 | Lipinski | G06F 11/0748 714/E11.021 |
| 2015/0073500 A1* | 3/2015 | Kothandaraman | A61N 1/36071 607/59 |
| 2015/0082025 A1 | 3/2015 | Deshpande | |
| 2015/0095406 A1* | 4/2015 | Dor | H04L 67/125 709/203 |
| 2018/0341931 A1* | 11/2018 | Myshkin | H04L 9/3236 |
| 2021/0167962 A1* | 6/2021 | Wang | H04L 9/006 |

OTHER PUBLICATIONS

PCT Search Report and Written Opinion for PCT/US21/020465, dated May 21, 2021.

* cited by examiner

*Primary Examiner* — Kambiz Zand
*Assistant Examiner* — Aubrey H Wyszynski
(74) *Attorney, Agent, or Firm* — Remenick PLLC

(57) ABSTRACT

The invention is directed to a cyber-attack proof, hack proof, two tier, bi-level computer system and methods. In particular, the invention protects against cyber-attacks and hacking.

20 Claims, 3 Drawing Sheets

SECURE COMPUTATIONAL AND COMMUNICATIONS SYSTEMS

REFERENCE TO RELATED APPLICATIONS

The present application claims priority to Provisional U.S. Application No. 62/817,667, filed Mar. 13, 2019 and entitled "Emerald Tablet," which is incorporated in its entirety.

BACKGROUND

1. Field of the Invention

The invention is directed to a cyber-attack proof, hack proof, two tier, multiple level computer system and methods. In particular, the invention protects against cyber-attacks and hacking.

2. Background and Description of the Invention

Existing cyber security technologies are being promoted by approximately 2200 companies. They are implemented solely for protecting information stored on Internet connected devices or transmitted over the Internet via wireline or wireless transmission. Virtually every day, a new major data breach or cyber-attack announcement occurs showing that communications and data storage infrastructures have been breached and corrupted.

Malware attacks are becoming more common. These targeted cyber-attacks are sophisticated, and costly. In addition to private cyber criminals, nation-state intelligence agencies and their proxies have the ability to access, monitor, modify, and copy information from virtually any transmission or internet connected stored data. Intrusion Detection Systems and Intrusion Prevention Systems (IDS/IPS) have clearly failed, as they are focused only on detection. Login access controls have also failed over the last several decades, and RSA-2048 protocol based security was compromised years ago.

The financial impact of cyber-attacks is enormous. It has been estimated that the financial impact of cybercrime is $1.7 trillion, for the cost of data loss and downtime, per annum. In addition, cyber-attacks can cause incalculable damage to national security, a country's infrastructure, and to individuals.

Traditional methods of securing digital communications, including all malware detection, immediate remediation software, as well as encryption and VPNs, do not provide protection from the world's bad actors. Therefore, there is a need for a new system of securing computer systems.

BRIEF DESCRIPTION OF THE DRAWINGS

There are shown in the drawings, embodiments which are presently preferred. It is expressly noted, however, that the invention is not limited to the precise arrangements and instrumentalists shown.

SUMMARY OF THE INVENTION

Figure 1:
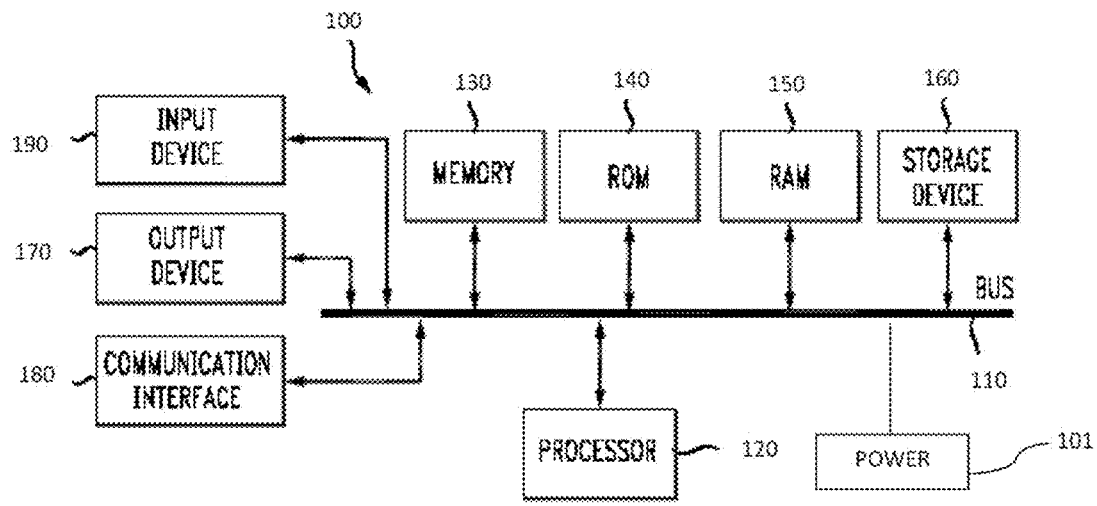
FIG. 1 is a schematic of an embodiment of a computing device.

The present invention overcomes the problems and disadvantages associated with current strategies and designs and provides new computer systems, devices and methods.

One embodiment of the invention is directed to a secured computer system, comprising a public facing work station, at least one secured server in data communication with only the work station, and a secured connection coupling the work station to the secured server.

In a preferred embodiment, the work station has a first data transmission device and each secured server has an additional data transmission device. Preferably, each data transmission device of each secured server is only capable of communicating with the first data transmission device. The secured connection is preferably an intermittent laser. Preferably, the work station is adapted to send and receive data from at least an internet or an unsecured data source.

Preferably, each secured server is walled off from outside sources of data. In a preferred embodiment, the work station is in data communication with a plurality of secured servers. Preferably, each secured server has at least one user access point. In a preferred embodiment, the system is a mobile system and the work station is one of a mobile phone, tablet, or laptop. Each secured server is preferably invisible to external systems.

Another embodiment of the invention is directed to a method of providing a secure computer system. The method comprises the steps of coupling a public facing work station to a data source, coupling at least one secured server to the work station with a secured connection, wherein each secured server is only able to communicate with the work station, parsing each incoming data transmission at the work station for abnormalities in the data, rejecting data transmissions with abnormalities at the work station, appending data transmissions without abnormalities with a data information tag at the work station, transmitting the tagged data transmissions from the work station to at least one secured server via the secured connection, parsing each incoming tagged data transmission at the secured server for compliance with the data information tag, and one of rejecting the tagged data transmission or accepting the tagged data transmission.

Preferably, the work station has a first data transmission device and each secured server has an additional data transmission device. In a preferred embodiment, each data transmission device of each secured server is only capable of communicating with the first data transmission device. The secured connection is preferably an intermittent laser. Preferably, the data source is at least an internet or an unsecured data source.

In a preferred embodiment, each secured server is walled off from outside sources of data. Preferably, the work station is in data communication with a plurality of secured servers. Preferably, each secured server has at least one user access point. In a preferred embodiment, the system is a mobile system and the work station is one of a mobile phone, tablet, or laptop. Each secured server is preferably invisible to external systems. Preferably, abnormalities include at least one of unexpected data size, unexpected data contents, unexpected data source, and unexpected data transmissions. Preferably, the data information tag includes at least one of a size of the data, a transmission rate of the data, timing of the data, and contents of the data.

Other embodiments and advantages of the invention are set forth in part in the description, which follows, and in part, may be obvious from this description, or may be learned from the practice of the invention.

DETAILED DESCRIPTION OF THE INVENTION

FIG. 1 depicts a schematic of a preferred embodiment of a computing device 100. Device 100 preferably includes a power source 101. For example, power source 101 may be a battery, a chemical power source, a solar energy converter, a power converter to receive power from a wall receptacle or the like, a mechanical power source, or source of power. Power source 101 is preferably used to supply power to the remaining components of computing device 100. Computing device 100 preferably further includes an integrated circuit (i.e. a system on a chip (SoC)). The SoC preferably integrates multiple components of a computer or other electronic system into a single chip. It may contain digital, analog, mixed-signal, and radio-frequency functions all on a single chip substrate. The SoC preferably incorporates one or more of a central processing unit (CPU), a graphics processing unit (GPU), and a system bus 110 that couples various system components including the system memory 130, dynamic random access memory (RAM) 150 and flash memory 160, to the SoC. The system bus may be one of several types of bus structures including a memory bus or memory controller, a peripheral bus, or a local bus using one of a variety of bus architectures. A basic input/output (BIOS) stored in flash memory 160 or the like, may provide the basic routine that helps to transfer information between elements within computing device 100, such as during start-up. The drives and the associated computer readable media provide nonvolatile storage of computer readable instructions, data structures, program modules and other data for computing device 500. The basic components are known to those of skill in the art and appropriate variations are contemplated depending on the type of device, such as whether the device is a small, handheld computing device, a desktop computer, a computer server, a handheld scanning device, or a wireless devices, including wireless Personal Digital Assistants ("PDAs"), tablet devices, wireless web-enabled or "smart" phones (e.g., Research in Motion's Blackberry™, an Android™ device, Apple's iPhone™), other wireless phones, a game console (e.g, a Playstation™, an Xbox™, or a Wii™), a Smart TV, a wearable internet connected device, etc. Preferably, the system is technology agnostic.

Although the exemplary environment described herein employs flash memory, it is appreciated by those skilled in the art that other types of computer readable media which can store data that are accessible by a computer, such as magnetic cassettes, hard drives, digital versatile disks, cartridges, random access memories (RAMs) 150, read only memory (ROM) 140, a cable or wireless signal containing a bit stream and the like, may also be used in the exemplary operating environment.

Computing device 100 further preferably includes at least one networking device 180. Networking device 180 is able to connect to, for example, the Internet, one or more Local Area Networks ("LANs"), one or more Metropolitan Area Networks ("MANs"), one or more Wide Area Networks ("WANs"), one or more Intranets, etc. Networking device 180 may be capable of connecting to wireless Bluetooth devices (e.g. a keyboard or a mouse). Preferably, networking device 180 is a wireless networking device (e.g. Wi-Fi), however hard-wired networks can be coupled to networking device 180 (e.g. ethernet). Furthermore, networking device 180 may also connect to distributed computing environments where tasks are performed by local and remote processing devices that are linked (either by hardwired links, wireless links, or by a combination thereof) through a communications network. In a distributed computing environment, program modules may be located in both local and remote memory storage devices. To enable user interaction with computing device 100, there is preferably an input receiving device 190. Input receiving device 190 can receive input from a number of input mechanisms, such as a microphone for speech, a touch-sensitive screen for gesture or graphical input, a keyboard, a mouse, motion input, RJ-45, USB, and so forth. In some instances, multimodal systems enable a user to provide multiple types of input to communicate with the computing device 100. There is no restriction on the invention operating on any particular hardware arrangement and therefore the basic features here may easily be substituted for improved hardware or firmware arrangements as they are developed.

Computing device 100 further preferably includes at least one output port 170. Output port 170 connects computing device 100 to a TV, speaker, projector, or other audio-visual device. Preferably, output port 170 is a HDMI port, optical audio port, serial port, USB port, networking port, s-video port, coaxial cable port, composite video, composite audio, and/or VGA port. In preferred embodiments, computing device 100 may also include additional auxiliary components (e.g. power management devices or digital audio convertors).

For clarity of explanation, the illustrative system embodiments are presented as comprising individual functional blocks. The functions these blocks represent may be provided through the use of either shared or dedicated hardware, including, but not limited to, hardware capable of executing software. For example, the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large-scale integration (VLSI) hardware embodiments, as well as custom VLSI circuitry in combination with a general purpose DSP circuit, may also be provided.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a computer, specialty computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate the preferred embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network, e.g. in the "cloud." In a distributed computing environment, program modules may be located in both local and remote memory storage devices.

A cyber-attack proof and hack proof computer system is described herein. The computer system is bi-level and two tiered wherein one computer preferably serves as a workstation (WS) that utilizes Internet capability. A second computer, the Primary Server (PS) is in data communication with the WS giving them the appearance of a single, fluid computer system. The WS and PS are in constant communication with one another using proprietary encryption software to independently monitor the WS and safely record and save all data to the stand-alone PS. Since all communications between the WS and PS are via electro-magnetic waves, data cannot enter the PS or server without user instructions. Accordingly, the design is 100% immune from cyber-attack and/or hacking events. Conversely, malicious software such as viruses, and unauthorized users cannot gain access to the PS. All saved data can only be accessed by the PS which does not have direct Internet access. In the event of a cyber-attack and the unlikely compromise of the WS, the user simply deletes and/or replaces the program in the WS and begins operating immediately. There is no stored data. A cyber-attack can never compromise or hack the Primary Server where all data is safely stored.

Figure 2:
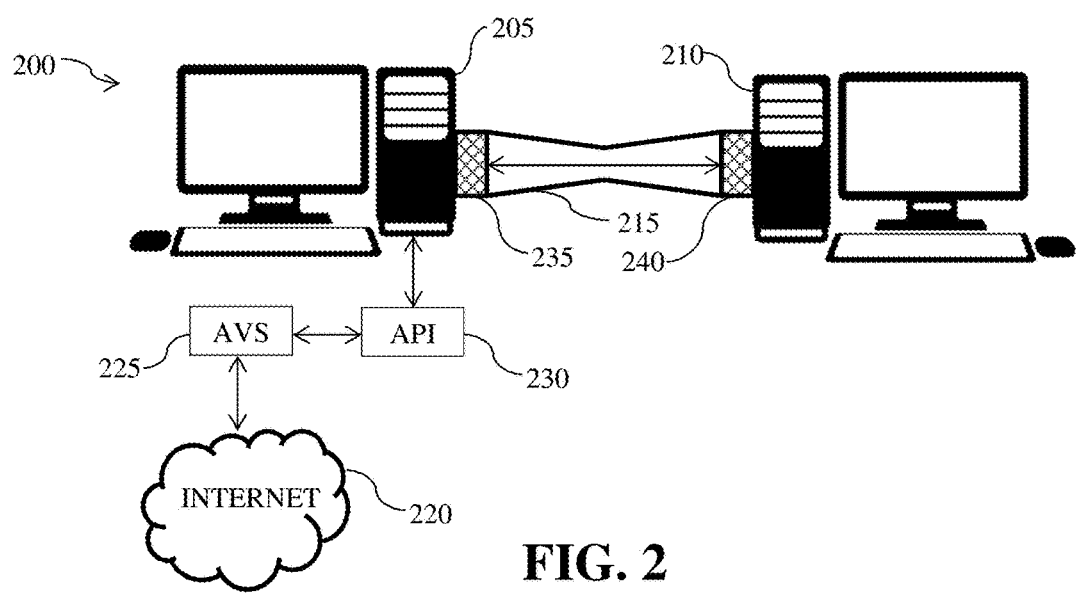
FIG. 2 is an embodiment of a schematic of a secured computing system.

FIG. 2 depict a schematic of an embodiment of the secured computing system 200. Preferably, secured computing system 200 is divided between a public facing Work Station (WS) 205 and a secure Primary Server (PS) 210. WS 205 and PS 210 preferably communicate via a secure connection 215. Each of WS 205 and PS 210 is preferably a computing device as described herein with at least one screen and at least one input device. In the preferred embodiment, WS 205 is adapted to receive data from and transmit data to the Internet 220 and other non-secured computing systems and data sources. WS 205 may have anti-virus software (AVS) 225 and/or anti-malware software scanning all incoming data. WS 205 may further have application programming interfaces (API) 230 to further enhance communications with the Internet. However, as is well known, these programs are not able to block all malicious attacks on computers or prevent hackers from accessing a computer. While WS 205 may be used as a typical computing system, preferably WS 205 primarily is used as an interface between the outside world and PS 210. WS 205 and PS 210 are preferably custom built for their intended uses, either WS 205 and/or PS 210 can be off the shelf computing systems with adapters added to facilitate the secure communications. In off the shelf embodiments, the systems may be modified or otherwise customized.

In the preferred embodiment PS 210 is unable to communicate with the Internet or any non-secured computing systems. Preferably, PS 210 is only able to communicate directly with WS 205. Furthermore, PS 210 may have no access ports (including disk drives, USB ports, memory card ports, etc.) through which users are able to upload data to PS 210. PS 210 is preferably unable to access external data sources wirelessly (including WiFi, Bluetooth, cellular networks, etc.). However, PS 210 is able to receive inputs from keyboards, mice, microphones, and other approved input devices and/or sensors via wired ports or wirelessly. Preferably, PS 210 is walled off from outside data sources and is inaccessible by outside users. While PS 210 is shown as a computing system, PS 210 may be a data center, server, or other large scale data storage system.

PS 210 preferably has direct access to secured data either through a local area network or directly coupled to PS 210. For example, PS 210 may be in communication with one or more databases, one or more servers, and/or one or more data storage devices. Preferably PS 210 is adapted to be used for the creation and/or manipulation of new and/or existing documents, spreadsheets, databases, and other computer files. Furthermore, PS 210 preferably has access to one or more computer programs either stored on PS 210 or stored remotely.

Preferably data can only be transferred to PS 210 from WS 205. The data transfer interface is secure connection 215. Preferably secure connection 215 is an intermittent laser where WS has a first send/receive device 235 and PS has a second send/receive device 240. Each send/receive device 235 and 240 is preferably a data transmission device adapted to transmit intermittent laser signals and receive intermittent laser signals. Preferably, the intermittent laser signals are outside the visual light spectrum. The signals may be sent through free space (for example, air) or through a dedicated medium (for example, a fiber optic cable). In other embodiments, PS 210 and WS 205 may be able to communicate via send/receive device 235 and 240 through a wired or wireless interface, for example through coaxial cable, Ethernet cable, over a dedicated WiFi protocol, through free-space optical communications (FSO), or another dedicated communications protocol.

Preferably prior to transmitting data, each send/receive device 235 and 240 evaluates the data to make sure there are no abnormalities. Abnormalities may include, but are not limited to, unexpected data sizes (i.e. too much data or too little data), unexpected data contents, unexpected source, and unexpected transmissions. If the send/receive device 235 or 240 detects an abnormality, preferably the send/receive device 235 or 240 will prevent the transmission of the data and send a request to the data source for new data and/or a notice that the data was not transmitted. Upon determination that a data transmission does not contain any abnormalities, the send/receive device 235 or 240 will preferably append the data with a data information tag and send the tagged data using a proprietary encryption software. The data information tag may include, for example, the size of the data packet, the transmission rate and/or timing of the data packet, and/or the contents of the data packet. Upon receipt of the data transmission by the other of send/receive device 235 or 240, the data information tag will preferably be read and the data packet will preferably be evaluated to make sure it complies with the data information tag. If the data packet does not comply with the data information tag, the data pack will preferably be destroyed and a request for new data and/or a notice that the data was not received will be sent.

FIG. 2 shows an embodiment of the secured computing system 200 with one WS 205 and one PS 210. The WS 205 and PS 210 are shown as separate entities linked by secure connection 215. In certain embodiments, WS 205 and PS 210 may have to be within a direct line of sight of each other so that the intermittent laser signals can be received. In other embodiments, WS 205 and/or PS 210 may have moveable send/receive device 235 and 240 so that the direct line of sight can be achieved without WS 205 and PS 210 being in the direct line of sight. In embodiments that use a physical connection or a connection that does not need a direct line of site, WS 205 and PS 210 may be co-located or remotely located from each other. For example, WS 205 and PS 210 may be in the same or different rooms, the same or different building, or the same ore different facilities.

In some embodiments, WS 205 and PS 210 may be housed within the same enclosure and share components. For example, WS 205 and PS 210 may share a keyboard, mouse, and screen, yet have different memory devices, processors, and communication devices. A user of PS 210 may be able to control WS 205, however a user of WS 205 is preferably unable to control PS 210.

Figure 3:
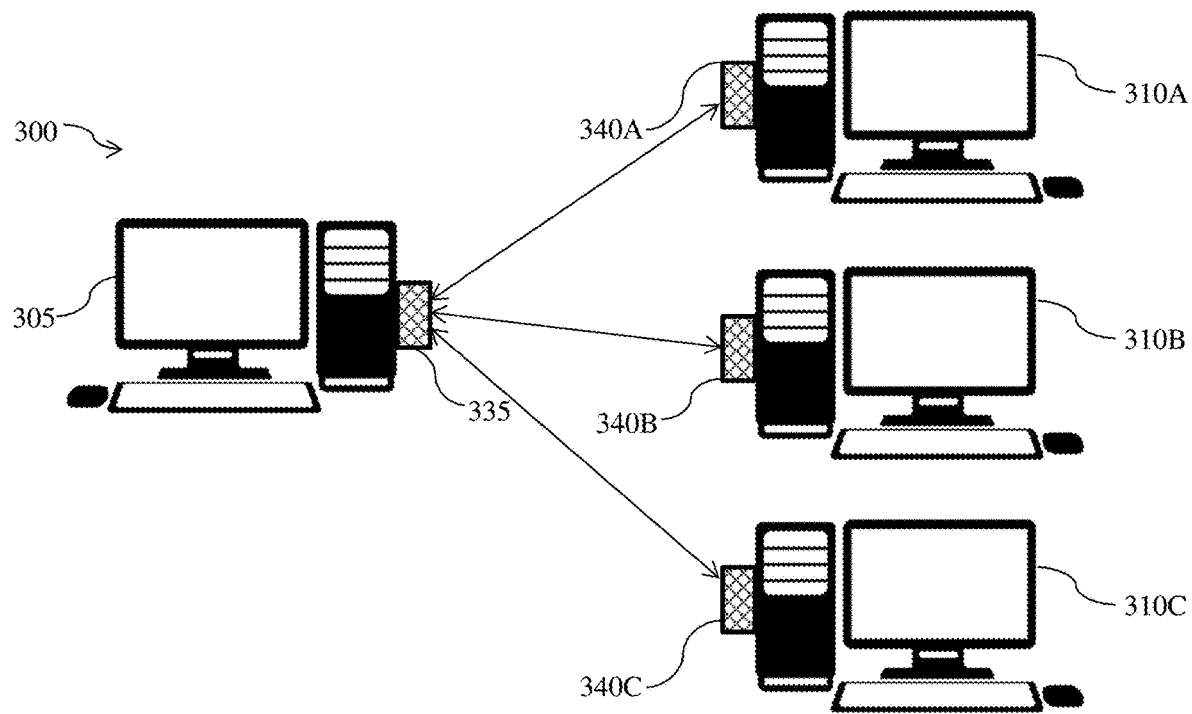
FIG. 3 is a second embodiment of a schematic of a secured computing system.

FIG. 3 depicts an embodiment of a secured computing system 300 with one WS 305 and multiple PSs 310A-C. Preferably, secured computing system 300 is similar to secured computing system 200 with additional PSs. While three PSs are shown more or fewer PSs can be included in secured computing system 300. Preferably, send/receive device 335 of WS 305 is capable of communicating with send/receive devices 340A-C of PSs 310A-C, respectively through a secured connection. Send/receive device 335 may use the same communications protocol for communicating with each of send/receive devices 340A-C or different protocols for each. PSs 310A-C may all be co-located with WS 305, remote from WS 305, or a combination thereof. While WS 305 is shown as a computing device, WS 305 may be another device. For example, WS 305 may be a satellite able to send transmissions from space to PSs on Earth, or a mobile device able to send transmissions to PSs within range.

In some embodiments, each PS 310A-C is able to communicate with each other PS 310A-C while in other embodiments only certain PSs can communicate or no PSs can communicate. Preferably, WS 305 is able to send data transmissions to specific PSs 310A-C without the other PSs 310A-C being able to receive the data transmissions. Additionally, WS 305 may be able to send out a general data transmission able to be received by all PSs 310A-C.

Figure 4:
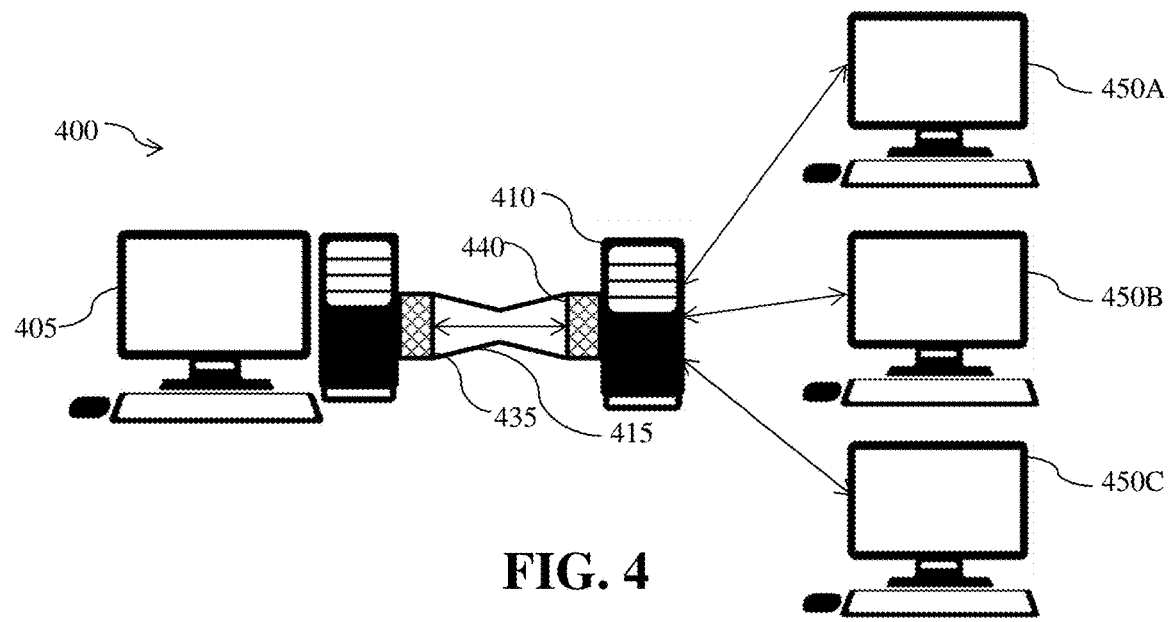
FIG. 4 is a third embodiment of a schematic of a secured computing system.

FIG. 4 depicts another embodiment of a secured computing system 400 with one WS 405 and one PS 410, where the PS 410 is able to support multiple access points 450A-C. Preferably, secured computing system 400 is similar to secured computing system 200 (including secure connection 415 and send/receive devices 435 and 440) with additional access points in a hub and spoke configuration. While three access points are shown more or fewer access points can be included in secured computing system 400. Preferably, each access point 450A-C includes a screen, keyboard, and mouse. Each access point may include other peripheral devices, however the access points preferably do not have independent memory or processing power. Preferably, the memory and processing is stored on PS 410.

PS 410 is preferably able to control access from each access point 450A-C. For example, users may need to log in and based upon their security level, users will only have access to certain data or programs stored on PS 410. Access points 450A-C may be co-located with PS 410 or remotely located from PS 410. Communication between access points 450A-C and PS 410 may be wired or wireless. A fully deployed secured computing system may have a combination of the setups of secured computing system 200, secured computing system 300, and/or secured computing system 400. Furthermore, the components of secured computing system 200, secured computing system 300, and/or secured computing system 400 are interchangeable.

Figure 5:
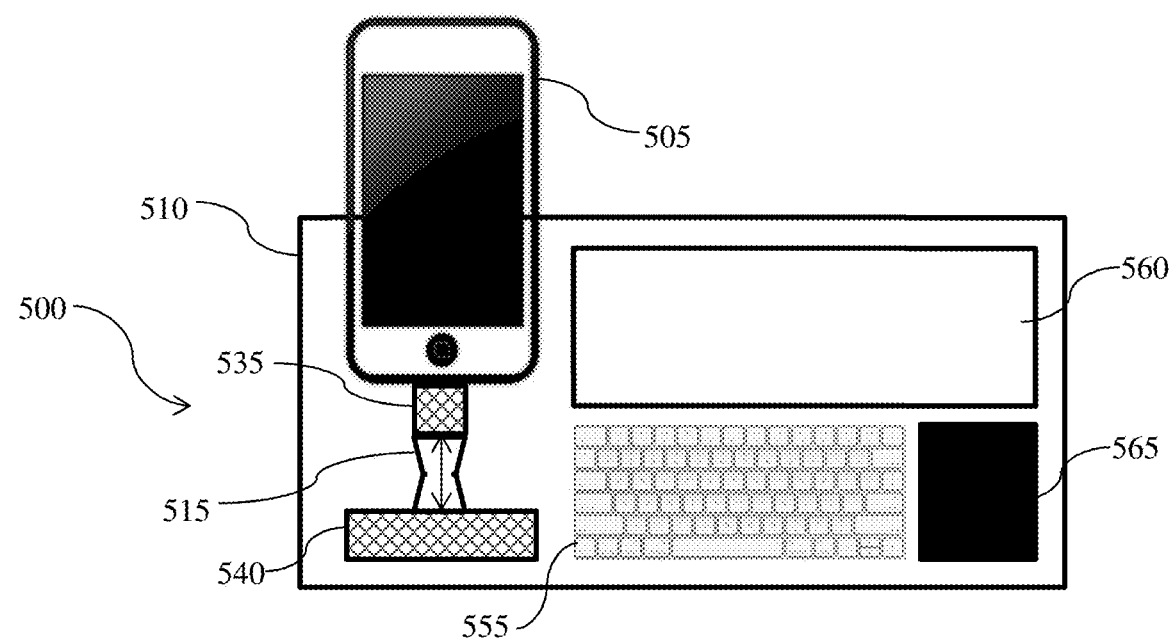
FIG. 5 is an embodiment of a schematic of a mobile secured computing system.

FIG. 5 depicts an embodiment of a mobile secured computing system 500. Preferably, mobile secured computing system is a portable personal device (PPD) 510 that is able to be coupled to a mobile phone, tablet, laptop, or other mobile device 505. Preferably, mobile device 505 is public facing and able to send and receive data (including telephone calls) from and to the Internet and any non-secured computing systems. Preferably, PPD 510 is a secured system only able to send and receive data from mobile device 505 through secure connection 515. Mobile device 505 may be inserted into PPD 510, as shown in the figure, with an intermittent laser as secure connection 515 or, in other embodiments secure connection 515 may be a wired or a wireless communication protocol. Preferably mobile device 505 has a first send/receive device 535 plugged into a port and PPD 510 has a second send/receive device 540. Each send/receive device 535 and 540 is preferably adapted to transmit intermittent laser signals and receive intermittent laser signals. Mobile device 505 may have custom software or applications installed that allow mobile device 505 to interface with PPD 510.

Preferably prior to transmitting data, each send/receive device 535 and 540 evaluates the data to make sure there are no abnormalities. Abnormalities may include, but are not limited to, unexpected data sizes (i.e. too much data or too little data), unexpected data contents, unexpected source, and unexpected transmissions. If the send/receive device 535 or 540 detects an abnormality, preferably the send/receive device 535 or 540 will prevent the transmission of the data and send a request to the data source for new data and/or a notice that the data was not transmitted. Upon determination that a data transmission does not contain any abnormalities, the send/receive device 535 or 540 will preferably append the data with a data information tag and send the tagged data using a proprietary encryption software. The data information tag may include, for example, the size of the data packet, the transmission rate and/or timing of the data packet, and/or the contents of the data packet. Upon receipt of the data transmission by the other of send/receive device 535 or 540, the data information tag will preferably be read and the data packet will preferably be evaluated to make sure it complies with the data information tag. If the data packet does not comply with the data information tag, the data pack will preferably be destroyed and a request for new data and/or a notice that the data was not received will be sent. Furthermore, the data may include phone call data and prior to accepting the phone call on mobile device 505 the system may scramble the audio to prevent interception of the conversation.

PPD 510 may have a keyboard 555, screen 560, and touch pad 565 as shown in FIG. 5 or may be a touch screen device. In other embodiments, PPD 510 may be a touch screen device. Yet, in other embodiments, PPD may use the components of mobile device 505. PPD 510 may have a power source (rechargeable or replaceable) or may be powered by mobile device 505. Preferably PPD 510 has separate processing and data storage from mobile device 505.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A secured computer system, comprising:
at least two public facing work stations, wherein each public facing work station is adapted to communicate with another public facing work station over an unsecured network; each public facing work station associated with and in data communication with at least one secured server, each secured server having one data transfer interface and at least one input receiving device, wherein each secured server is only able to receive data through the data transfer interface and the input receiving devices; and
a secured connection directly and constantly coupling each work station to each of the associated secured servers' data transfer interfaces, thereby limiting data received by the data input device to data sent by the associated work station.

2. The secured computer system of claim 1, wherein the work station has a first data transmission device coupled to the secured connection and a second data transmission device coupled to the unsecured network.

3. The secured computer system of claim 2, wherein each data transmission device of each secured server is only capable of communicating with the first data transmission device of the associated work station.

4. The secured computer system of claim 2, wherein the secured connection is an intermittent laser.

5. The secured computer system of claim 1, wherein the unsecured network at least one of an internet or an unsecured data source.

6. The secured computer system of claim 1, wherein each secured server is walled off from outside sources of data.

7. The secured computer system of claim 1, wherein each secured server has at least one user access point.

8. The secured computer system of claim 1, wherein the at least one work station is one of a mobile phone, tablet, or laptop.

9. The secured computer system of claim 1, wherein each secured server is invisible to external systems.

10. A method of providing a secure computer system, comprising the steps of:
coupling a first public facing work station to a unsecured network;
coupling at least one other public facing work station to the unsecured network;
coupling at least one secured server, each secured server having one data transfer interface and at least one input receiving device, to each work station with a secured connection,
wherein each secured server is only able to receive data through the data transfer interface and the input receiving devices;
wherein each secured connection directly and constantly couples each secured server's data transfer interface to the work station it is coupled to, thereby limiting data received by the data input device to data sent by the work station it is coupled to;
parsing each incoming data transmission at the work station for abnormalities in the data;
rejecting data transmissions with abnormalities at the work station;
appending data transmissions without abnormalities with a data information tag at the work station;
transmitting the tagged data transmissions from the work station to at least one secured server via the secured connection;
parsing each incoming tagged data transmission at the secured server for compliance with the data information tag; and
one of rejecting the tagged data transmission or accepting the tagged data transmission.

11. The method of claim 10, wherein the work station has a first data transmission device coupled to the secured connection and a second data transmission device coupled to the unsecured network.

12. The method of claim 11, wherein each data transmission device of each secured server is only capable of communicating with the first data transmission device of the work station it is coupled to.

13. The method of claim 11, wherein the secured connection is an intermittent laser.

14. The method of claim 10, wherein the unsecured network is at least one of an internet or an unsecured data source.

15. The method of claim 10, wherein each secured server is walled off from outside sources of data.

16. The method of claim 10, wherein each secured server has at least one user access point.

17. The method of claim 10, wherein the at least one work station is one of a mobile phone, tablet, or laptop.

18. The method of claim 10, wherein each secured server is invisible to external systems.

19. The method of claim 10, wherein abnormalities include at least one of unexpected data size, unexpected data contents, unexpected data source, and unexpected data transmissions.

20. The method of claim 10, wherein the data information tag includes at least one of a size of the data, a transmission rate of the data, timing of the data, and contents of the data.

\* \* \* \* \*